Sept. 29, 1970  L. D. STRANTZ  3,530,600
EARTHMOVING SCRAPER WITH FLUIDIC CONTROL MEANS
Filed Oct. 26, 1967  2 Sheets-Sheet 1

INVENTOR
LAWRENCE D. STRANTZ

JOHN F. SCHMIDT
ATTORNEY

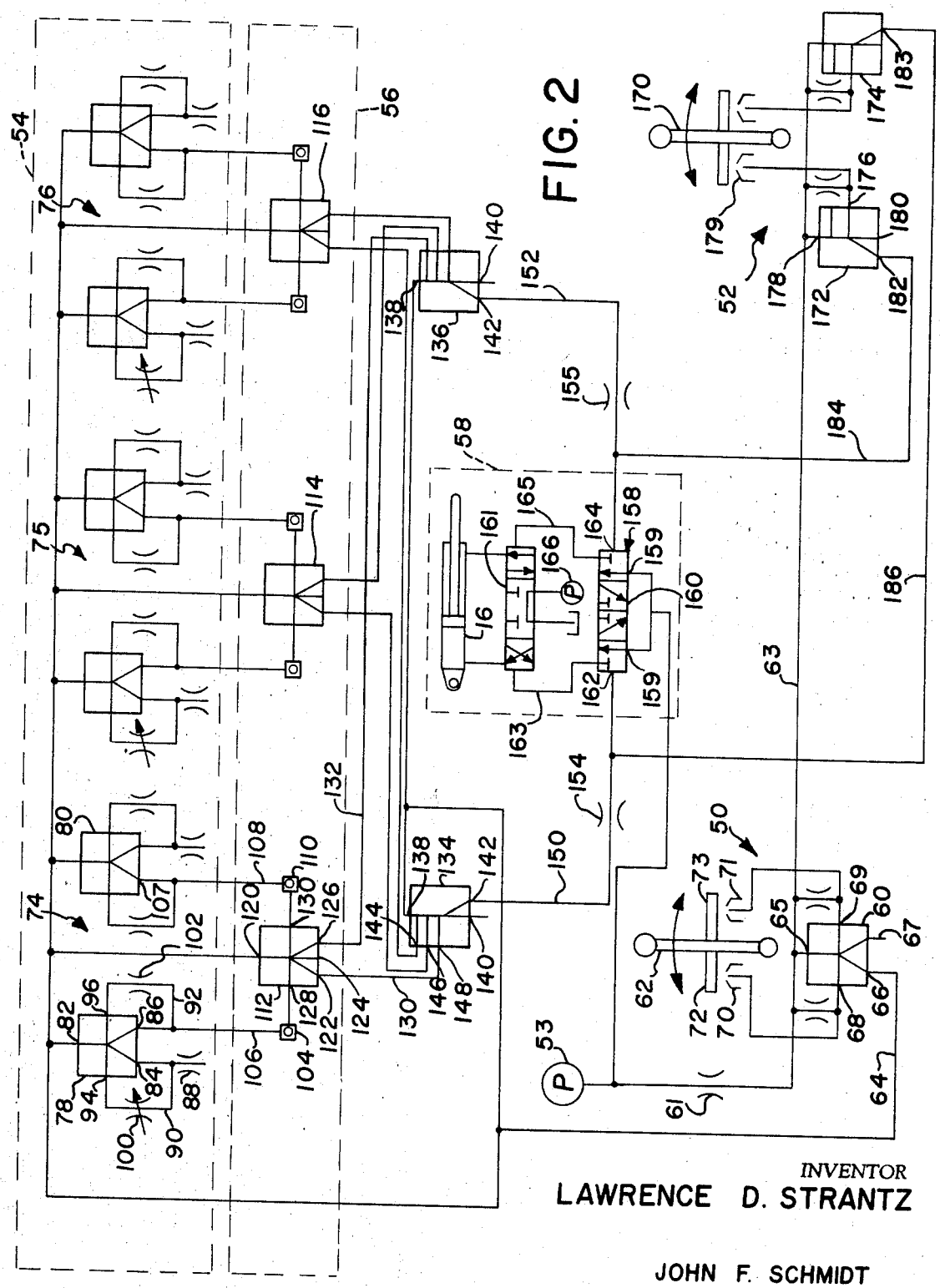

United States Patent Office 3,530,600
Patented Sept. 29, 1970

3,530,600
EARTHMOVING SCRAPPER WITH FLUIDIC
CONTROL MEANS
Lawrence D. Strantz, Washington, Ill., assignor to Westinghouse Air Brake Company, Peoria, Ill., a corporation of Pennsylvania
Continuation-in-part of application Ser. No. 659,112, Aug. 8, 1967. This application Oct. 26, 1967, Ser. No. 678,317
Int. Cl. E02f 3/85
U.S. Cl. 37—129                                   6 Claims

ABSTRACT OF THE DISCLOSURE

A dust-tolerant, automatic fluidic control for an earthmoving scraper of the elevating type for controlling the depth of cut of a scraper cutting edge in accordance with tractor engine fuel rack setting, drive wheel slippage, and elevator speed, priority of control being given to any fluidic signal inducing upward movement of the cutting edge. Because fluidic conduit lengths in such an application may be in excess of ten feet, and for this reason present problems of line loss and signal transmission time, the present invention provides a plurality of digital fluidic pulse generating means, each including a digital oscillator for generating a pulse at a controlled frequency to be received by an analog or porportional amplifier, which compares this pulse with a reference. The output of the proportional amplifier is ultimately directed to an interface valve for controlling hydraulic flow from a high pressure source to a hydraulic motor controlling the elevation of the scraper cutting edge. A manual override is provided to permit manual control of cutting edge elevation in spite of signals generated by the automatic system.

RELATED APPLICATION

This application is a continuation-in-part of U.S. patent application by Lawrence D. Strantz, Ser. No. 659,112, filed Aug. 8, 1967, and entitled "Fluid Device."

SUMMARY OF THE PRIOR ART

Heretofore, automatic controls for controlling the depth of cut of an earthmoving scraper cutting edge in accordance with various parameters, such as engine speed and drive wheel slippage, have been available. Conventionally, such controls have included mechanical, electrical, or hydraulic systems for measuring the parameter, comparing the parameter with a reference, and adjusting the cutting edge accordingly to achieve maximum scraper efficiency for the particular operating condition or environment. However, such controls, and scraper controls in general, have not always been satisfactory because they were often expensive, complicated or generated substantial maintenance problems. One reason for this is that excavators, and in particular earthmoving scrapers, must often operate in extremely dusty environments. In some operations wherein fine, dry materials are being excavated, it is sometimes difficult to see the excavating machine because of the clouds of dust generated during operation thereof. Under such conditions, life of the often exposed and delicate controls discussed above is seriously affected. Additionally, accuracy of such controls in a rough excavating environment, is often adversely affected by shocks and vibrations, as for example, those induced during high-speed travel of an earthmoving scraper.

Recently, the relatively new science of fluidics has been utilized in sophisticated applications such as in guided missiles requiring logic functions. The National Fluid Power Association, in its recommended standards, defines "Fluidics" as a "technology wherein sensing, control, information processing, and/or actuation functions are performed solely through utilizing fluid-dynamic phenomena." An example of such phenomena is the "wall attachment" or "Coanda Effect" forming the basis of the devices disclosed in U.S. Pat. 3,117,593 and 3,158,166 to Sowers and Warren, respectively. Fluidic control systems are favored because they may be relatively compact and inexpensive, have no moving parts, are reliable in spite of extreme temperature changes, and may be operated with extremely low pump or compressor outputs and pressures, such as two cubic feet per minute at three pounds per square inch. More importantly however, such fluidic control systems are potentially well-suited for control of various components of excavation machines because they are insensitive to vibration and shock and may be designed to be modular and self-purging and therefore reliable in dusty conditions such as those often prevailing in excavating environments. However, utilization in such environments, as for example on an earthmoving scraper, has been hindered because long fluidic conduit lengths may be required and transmission of a pure pressure signal of a relatively small magnitude at low pressure in line lengths in excess of ten feet often has not been satisfactory because of line losses and extended transmission times. This has been particularly troublesome in fluidic systems for monitoring remote vehicle components wherein the fluidic components of the system may be spaced apart by as much as 40 to 50 feet.

SUMMARY OF THE INVENTION

It is a general object of the present invention to provide a fluidic control system for an excavator which circumvents or minimizes the problems heretofore noted.

In achieving this general object, the present invention provides an excavator having a cutting element adapted to contact a surface for excavating the same, motor means for positioning the cutting element, and means to supply motive energy for actuating the motor means. According to the present invention, control means for controlling the flow of motive energy is provided, the control means including a source of fluid under pressure, conduit means connecting the source of fluid under pressure to an interface device, and fluidic control means interposed in the said conduit for controlling the flow of fluid to said interface device by utilizing fluid dynamic phenomena.

In the preferred embodiment of the present invention, a plurality of digital fluidic pulse generating means are provided, the output frequency of each of which is proportional to tractor engine fuel rack setting, drive wheel slippage, or scraper elevator speed. The output of the fluid pulse generating means is directed to fluidic proportional amplifier means the output magnitude and direction of which are dependent upon the frequency of the input. The output of the proportional amplifier means is directed to interface valve means for controlling said actuating means.

BRIEF DESCRIPTION OF THE DRAWINGS

In describing the invention, reference will be made to the accompanying drawings wherein:

FIG. 2 is a diagram of a fluidic control system adapted to be utilized with the earthmoving scraper shown in FIG. 1;

DESCRIPTION OF A PREFERRED EMBODIMENT

Figure 1:
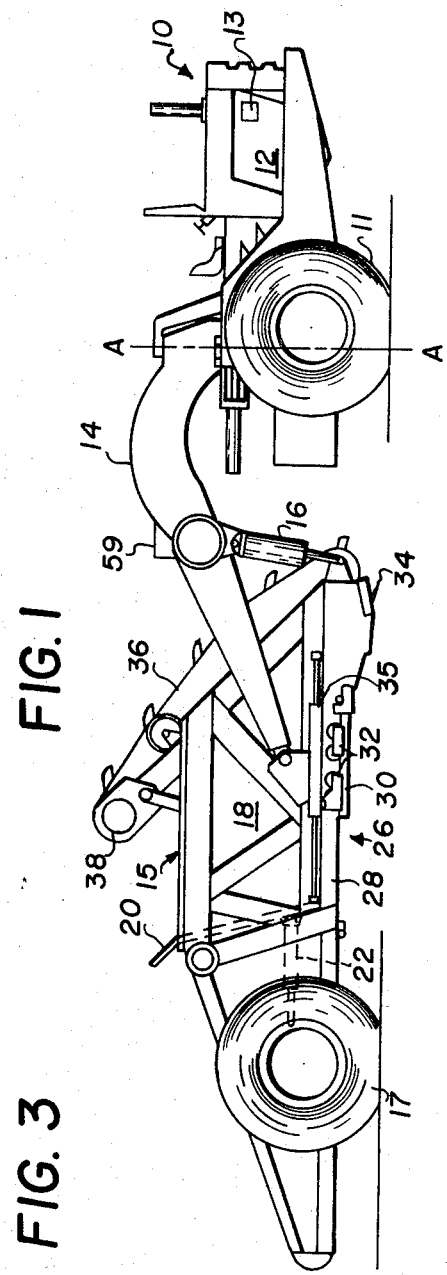
FIG. 1 is a side elevation view of an earthmoving scraper of the elevating type including a fluidic control system according to the present invention.

Referring in more detail to FIG. 1 of the drawing, an earthmoving scraper shown therein comprises a conventional wheeled tractor 10 having drive wheels 11, an engine 12, and a conventional fuel governor 13 including a rack, not shown, to control fuel flow to the engine. The tractor 10 is adapted to be pivotally connected to a scraper gooseneck and draft frame assembly 14, the rear end of which is pivotally connected to a bowl assembly 15 of a generally conventional type. A pair of double-acting hydraulic bowl hoist jacks 16 connect these latter elements for elevational adjustment of the bowl assembly by directing hydraulic flow from a tractor-mounted hydraulic pump through a hydraulic valve mounted on the frame assembly 14 for actuating the jacks 16.

The bowl assembly 15 is supported on its rear end by free-rolling wheels 17 and includes a pair of laterally spaced, vertically extending side walls 18 between which a vertically extending ejector or tailgate 20 is positioned. To reciprocate the ejector, a double-acting, hydraulic jack 22 is provided. The bowl assembly 15 further comprises a horizontally extending floor 26 extending between the side walls 18, the floor 26 including a rearward, fixed floor section 28 and a forward movable or slidable floor section 30 supported at its lateral ends on the side walls 18 by roller assemblies 32. A cutting edge 34 is fixedly connected to the side walls 18 forwardly of the slidable floor section 30. Double-acting hydraulic jacks 35 are provided to retract the slidable floor section 30 to expose an opening for ejection of materials by forward movement of the ejector 20.

To aid in moving materials excavated by the cutting edge 34 upward and rearward in the bowl assembly 15, a conventional elevating conveyor assembly 36 is positioned in the forward open end of the bowl assembly 15 above the cutting edge 34. The elevating conveyor assembly 36 includes an eletric motor 38 on the upper end thereof which functions to drive the conveyor assembly 36 in a clockwise direction, as shown in FIG. 1, for the desired loading effect.

To obtain a maximum efficiency in operation of the earthmoving scraper shown in FIG. 1, the depth of cut should be varied to prevent overloading the elevating conveyor assembly 36, to maintain slippage of the drive wheels 11 at an optimum level, and to prevent overloading or lugging of the engine 12. To automatically vary elevation of the cutting edge 34 in accordance with these parameters, the present invention provides a fluidic control system, schematically illustrated in FIG. 2 of the drawings. The fluidic control system generally comprises a manually operable, automatic control selector assembly 50, and a manually operable, cutting edge elevation manual control assembly 52 for directing fluid under pressure from a source 53 to one or both of these assemblies for either manual control only, or automatic control with a manual override. For automatic control, a fluidic digital system 54 is provided for monitoring each of the parameters and accordingly send a appropriate fluidic signal to control the output of a fluidic analog system 56. The analog system 56 controls a high-pressure hydraulic system 58 which functions to actuate the bowl hoist jacks 16 to control the elevation of the cutting edge 34.

The automatic control selector assembly 50 comprises a digital, bistable or flip-flop, load insensitive, fluidic gate 60, such as produced by the Fluidic Parts Department, Corning Glass Works, Catalog No. 190415. Gate 60 receives fluid at a reduced pressure (two or three p.s.i.) from source 53 through a restrictor 61. (Unless otherwise stated, all pressures given are gage pressures.) Gate 60 is manually operable by actuation of a lever 62 positioned adjacent the tractor operator's compartment to direct the output from the source of fluid pressure 53, either to a conduit 63, or to both conduits 63 and 64. The source of fluid pressure 53 may be an air compressor providing about two c.f.m. at several atmospheres. The gate 60 includes a supply port 65 in fluid communication with first and second output ports 66 and 67 which are in fluid communication with control signal input ports 68 and 69. The control ports 68 and 69 are in fluid communication with nozzles 70 and 71 which may be blocked by shoulders 72 and 73 on the lever 62. Upon positioning lever 62 to the left from the position shown in FIG. 2, nozzle 70 will be blocked effecting a back pressure in the conduit connecting nozzle 70 with port 68, whereupon flow from compressor 53 will be directed to second output port 67. However, upon positioning manual control lever 62 to the right of the position shown in FIG. 2, nozzle 71 is blocked, and fluid output from compressor 53 is directed not only to conduit 63 but is also switched to the first output port 66 connected with conduit 64. In this manner, fluid under pressure is directed to the digital system 54 to achieve automatic control of the cutting edge in accordance with the parameters being monitored.

The digital system 54 comprises three pairs of oscillator assemblies 74, 75 and 76 for monitoring elevating conveyor speed, drive wheel slippage, and fuel governor rack setting, respectively. Each oscillator assembly includes first and second digital, bistable oscillators 78 and 80. The oscillator 78 is conventional and basically like bistable gate 60 but includes a conduit directing output flow from each output port back to each control signal input port. The oscillator includes a supply port 82 for directing flow from compressor 53 alternately, in an oscillating manner similar to that discussed in the prior patents heretofore identified, through first or second output ports 84 and 86. A restriction 88 is provided in the conduit from output port 84 which is vented to the atmosphere, and a pair of conduits 90 and 92 are directed from output ports 84 and 86 to the control signal input ports 94 and 96 which are in fluid communication with supply and output ports 82, 84 and 86. A variable capacitor 100 is interposed in the conduit 90 and is adapted to be automatically varied, in any suitable manner, in accordance with the parameter being monitored, i.e., elevator speed, drive wheel slippage, or governor fuel rack setting. Variation of the capacitance induces proportional variations of the frequency of the fluidic output pulse at either output port. The conduit 92 is provided with a restriction 102 and output port 86 is placed in fluid communication with a first capacitor 104 by a conduit 106 which may be of a length greater than ten feet depending upon the location of the parametric device being monitored.

The second oscillator 80 is similar in construction to the first variable capacitance oscillator 78 but is of a fixed capacitance whereby it may serve as a reference against which the frequency of the output of the variable capacitance oscillator 78 may be compared by a frequency discriminator. The output of a first output port 107 of the fixed capacitance oscillator 80 is directed through a conduit 108 to a second capacitor 110.

The analog system 56 functions as a frequency discriminator and comprises three analog or proportional center tap or dump amplifiers 112, 114 and 116 in fluid communication with the oscillator assemblies 74, 75 and 76 respectively. These amplifiers may be of the type manufactured by Fluidics Products Division, Corning Glass Works, Catalog No. 190807. Each amplifier includes a supply port 120 which is connected to the compressor 53 for directing fluid flow through first, second and third output ports or "legs" 122, 124, and 126, respectively which are in fluid communication with control input signal ports 128 and 130. Flow output magnitude and direction is dependent upon pressure differential across control input ports 128 and 130. If no pressure differential exists across control input ports 128 and 130, fluid flow is directed through the second port or leg 124 which is vented to atmosphere. The first and third output ports 122 and 126 of each of the amplifiers 112, 114 and 116 are connected by conduits 130 and 132 to one control input signal port of first and second fluidic or/nor gates 134 and 136 respectively such as manufactured by Fluidic Products Division, Corning Glass Works, Catalog No. FC-190582. Each or/nor gate 134 and 136 carries a supply port 138 for directing flow from the compressor 53 to either first or second output port 140, 142. Such flow is normally directed to the first output port 140 which is vented to atmosphere. However, if a fluidic signal is directed to any of control signal input ports 144, 146 and 148, which are in fluid communication with the supply port 138 and output ports 140 and 142, fluid is switched from the vented first port 140 to the second output port 142 and to the high pressure hydraulic system 58. Or/nor gate 134 emits all "down" signals while or/nor gate 136 emits all "up" signals. The gates 134 and 136 are placed in fluid communication with the hydraulic system 58 by a pair of conduits 150 and 152, respectively.

To give priority to any "up" signal generated by the up signal or/nor gate 136, restrictions 154 and 155 are placed in the conduits 150 and 152 between the hydraulic system 58 and the or/nor gates 134 and 136. The restriction 154 in the conduit 150 from the down signal or/nor gate 134 is greater than the restriction 155 and therefore pressure drop across the restriction 154 is greater, as will be discussed hereinafter.

The hydraulic system 58 basically comprises a fluidic interface valve assembly 158, such as manufactured by Automatic Switch Company, Catalog No. FF-41. The interface valve 158 functions to permit actuation of the high-pressure hydraulic valve 161 in accordance with signals generated by the low pressure fluidic circuit. Interface valve assembly 158 comprises a three position spool valve 160 having up, down and hold positions, which is adapted to be moved in accordance with pressure signals from down and up signal or/nor gates 134 and 136. The interface valve assembly 158 is in fluid communication with the conduits 150 and 152 from the or/nor gates 134 and 136. In the embodiment illustrated, air under pressure moves the spool of a valve which directs or controls the flow of hydraulic fluid. The properties of the hydraulic valve are such that air under substantial pressure is required, by which is meant a pressure of several atmospheres rather than one atmosphere or a fraction of an atmosphere. Accordingly, means are provided to supply air at a substantial pressure to actuate the hydraulic valve and these means may consist of any of a variety of expedients, such as air in the system already available at the desired substantial pressure, air available in the system at a low pressure but passed through a pressure multiplier, etc. As illustrated in FIG. 2, air at a substantial pressure is taken from the supply port of pump 53 at the upstream side of restriction 55 and directed to the supply inlets 159 of the interface valve assembly 158. Interface valve 158 directs air under substantial pressure to hydraulic valve 161 as determined by down and up signal or/nor gates 134 and 136. Interface valve 158 is in fluid communication with conduits 150 and 152 from or/nor gates 134 and 136. Hydraulic valve 161 controls high pressure hydraulic fluid flow from tractor mounted pump 166 to or from the rod or piston chamber of bowl hoist cylinder 16 to thereby control the elevation of the scraper cutting edge 34. Hydraulic valve 161 is in fluid communication with the conduits 163 and 165 from the interface valve 158.

To permit elimination of the automatic feature of the present invention at the operator's option, the manual control fluidic valve assembly 52 is provided for independent control of the interface valve assembly 158. The manual control assembly 52 comprises a control lever 170 mounted adjacent the operator's compartment for controlling fluid flow from the compressor 53 through a pair of or/nor gates 172 and 174. The gates 172 and 174 are basically similar to or/nor gates 134 and 136 except that the former have a reduced number of control signal input ports 176. Gate 172 may be considered an up signal gate, while gate 174 is a down signal gate. Fluid flow from the compressor 53 and the conduit 63 is normally directed through a supply input port 178 to an output port 180 which is vented to atmosphere. However, upon an increase of the control signal in the control signal input port 176 by repositioning of the lever 170 to the left to close the vent (nozzle 179) for control port 176, fluid flow is switched to a second output leg 182. Conduits 184 and 186 connect output ports 182 and 183 respectively to the three position spool valve 160. It should be noted that the conduits 184 and 186 are connected in the conduits 150 and 152 downstream of the restrictions 154 and 155.

OPERATION

To achieve automatic control of the elevation of the cutting edge 34 in accordance with variations of the parameters being monitored, the automatic control selector lever 62 is placed in a position to the right from that shown in FIG. 2. Fluid from the compressor 53 is thereby directed to conduit 64 for an automatic control within a manual override. Fluid in the conduit 64 is directed to the digital system 54 and, depending upon the capacitance of the variable capacitors 100 of each of the oscillator assemblies 74, 75 and 76, a standing wave pulse frequency is established at the output port 86 and is directed to the capacitor 104. Similarly, a pulse at a predetermined frequency is directed to the capacitor 110 from the fixed capacitance oscillator 80. The digital signal is then converted into an analog signal by virtue of the fact that the proportional amplifiers 112, 114 and 116 function as a frequency discriminator as follows. Fluid pressure in the capacitors is proportional to the frequnecy of the input pulse. Unless the pulse frequencies from both oscillators 78 and 80 are the same, a pressure differential is induced across the control signal input ports 128 and 130. Because of this pressure differential, a portion of the output from the proportional amplifier is switched from the vented center output port 124 to either of the first and third output ports 122 and 126, depending upon whether the frequency of the fixed capacitance oscillator 80 is greater or less than the frequency of the variable capacitance 78. In this manner, the analog system signals the necessity of a down or up adjustment of the cutting edge 34. Any automatic control down signal is directed to the down signal or/nor gate 134 and any up signal is directed to the up signal or/nor gate 136 for switching the flow through these gates from the vented ports 140 to the conduits 150 or 152 connecting these gates with the interface valve assembly 158.

Assuming a condition wherein, for example, elevator speed and traction are such that a greater cutting edge depth is advisable for scraper efficiency, as signaled by down signal or/nor gate 134, but wherein the engine is in a lug condition requiring a lesser depth of cut, as signaled by up signal or/nor gate 136, some means must be provided to give priority to an up signal or the tractor engine will stall. Such is accomplished by the provision of restrictions 154 and 155 in the conduits 150 and 152.

Although the interface valve 158, having fluidic input ports 162 and 164, is symmetrical with both ports 162 and 164 having the same area and the up and down signals are initially of a like pressure, the pressure exerted on the down signal port 162 is less than the pressure exerted on the up signal port 164 because the restriction of, and pressure drop across, restriction 154 is greater than that of the restriction 155. In this manner, any up signal will generate a greater force than any down signal, moving the spool valve 160 in a left-hand direction, as shown in FIG. 2, thereby directing fluid from the tractor-mounted pump 166 to the rod ends of the bowl hoist cylinders 16 to elevate the cutting edge 34.

Regardless of any signal generated by the automatic portion of the instant invention, a manual override is provided by the manual control system 52. It will be noted that no restrictions are placed in the conduits 184 and 186 from the manual control or/nor gates 172 and 174. Therefore, signals from the manual control assembly 52 will generate a greater force on the interface valve ports 162 and 164 than will signals from the automatic system.

It is of particular significance to note that, with the exception of the manual control levers 62 and 170, the fluidic portion of the present control includes no moving parts. Additionally, such fluidic systems lend themselves to a modular construction wherein many of the elements of the digital and analog systems 54 and 56 may be formed in a single laminated block-like structure of a size less than that of an ordinary cigar box. It is therefore practical to house such fluidic elements completely in a filtered enclosure, as at 59 in FIG. 1.

Still further, heretofore it was not thought practical to utilize fluidic systems wherein fluidic line lengths were in excess of 10 feet, because of inaccuracies provoked with system signal outputs of one or two c.f.m. at two or three p.s.i. as to slow transmission times and signal distortion through line losses. However, because the present invention utilizes digital components for continuously generating a standing wave pulse, line losses are not problematical and system changes are reflected relatively quickly by changes in pulse frequency. Problems heretofore encountered because of transmission times and distortion through line losses of a simple, on or off, non-oscillating signal initiated only upon a system change, are circumvented. This is of particular significance in an excavator environment such as an earthmoving scraper, wherein fluidic line lengths may of necessity be as great as 50 feet. Finally, because the flow from the compressor 53 is constantly vented to the atmosphere through the fluidic elements, the present fluidic system purges itself of any dust which may be present therein and remains operable and accurate in the often extremely dusty conditions prevalent in excavating environments.

Figure 3:
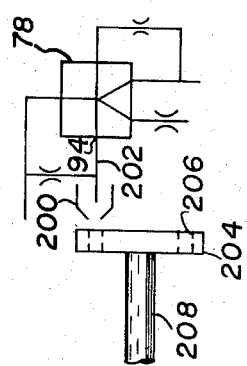
FIG. 3 is a diagram of a fluid pulse generator adapted to be utilized with the fluidic control system illustrated in FIG. 2.

Although any suitable means may be incorporated in the present invention to vary the variable capacitors 100 in accordance with the parameter being measured, one embodiment of the present invention found to be particularly suitable for controlling the output of the oscillator assembly 74 in accordance with scraper elevator conveyor speeds, is depicted in FIG. 3. In this embodiment, the control port 94 of the bistable element 78 is placed in fluid communication with a nozzle 200 by a conduit 202. The nozzle 200 abuts a plate 204 having a plurality of circularly arranged bores 206 about the periphery thereof. The plate is adapted to be rotated by shaft 208 operatively connected to the drive motor 38 of the elevating conveyor assembly 36. In this manner the frequency signal of the oscillator 78 is tuned to the elevator conveyor speeds.

In regard to measurement of drive wheel slippage, an arrangement similar to that shown in FIG. 3 may be provided to measure the rotational speed of each of the drive and free-rolling wheels 11 and 17, respectively of the tractor and scraper. The rotation of the free-rolling wheel 17 may be measured by the fixed capacitance oscillator 80, the output of which may be considered a reference. The rotation of the drive wheel 11 may be sensed by the variable capacitance oscillator 78. It has been found that for maximum tracitive efficiency, a slippage of about 12 to 16 percent is desirable. Upon the occurrence of greater or lesser drive wheel slippage, frequency of variation between the oscillators 78 and 80 of the oscillator assembly 75 will be directed to the proportional amplifier 114 for appropriate adjustment of the cutting edge 34.

Figure 4:
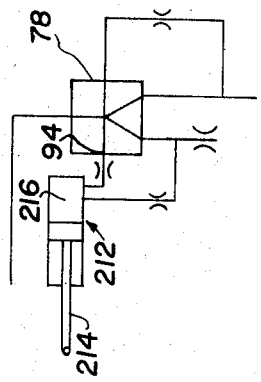
FIG. 4 is a diagram of another embodiment of a fluid pulse generator adapted to be utilized with the system illustrated in FIG. 2.

In FIG. 4 of the drawings, another embodiment of the present invention for adjusting the variable capacitance of the oscillator assembly 76 of FIG. 2 is shown. In the FIG. 4 embodiment, the control signal input port 94 of the variable capacitance oscillator 78 is connected to the head chamber 216 of a variable volume device 212, the volume of which is adapted to be varied by movement of a piston and rod assembly 214 which is connected to, and moved in accordance with, the governor fuel rack, controlling fuel to the engine 12.

Figure 5:
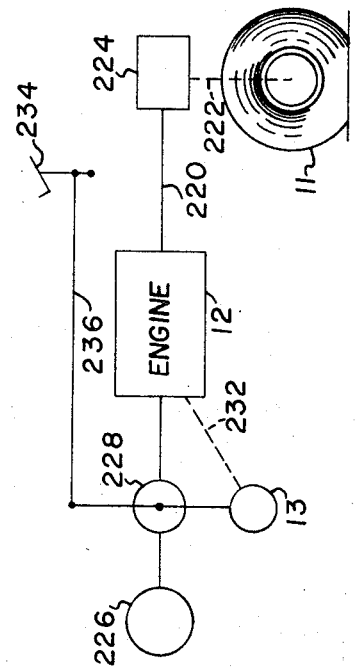
FIG. 5 is a schematic view of the power train and the fuel control.

FIG. 5 shows, schematically a preferred power train and fuel control arrangement. Engine 12 drives wheel 11 through a propeller shaft 220, a drive axle 222, and the usual related power transmission devices (change speed gears, torque converter or clutch, differential gears, etc.) all of which are lumped together schematically at 224. Fuel stored in tank 226 flows to engine 12 under the control of a suitable fuel regulator (carburetor for a gasoline engine, injection device for a Diesel engine) 228. Regulator 228 is controlled by governor 13 through a connection 232 with engine 12. An operator-operable device such as a pedal 234 is connected with regulator 228 and governor 13 by means of linkage 236.

Scrapers of the type herein described and illustrated are conventionally steered about a steering axis A—A (FIG. 1). Numerous such steering mechanisms are known to those skilled in the art and it will suffice here to refer to Pat. 3,338,329, issued Aug. 29, 1967 to Edward G. Orth, for a disclosure in detail of the steering mechanism shown in FIG. 1.

What is claimed is:

1. In an excavator having a cutting element adapted to contact a surface for excavating the same, motor means for positioning the cutting elements, and means to supply motive energy to actuate the motor means; the improvement comprising:

control means for said energy supply means, the control means including a source of fluid under low pressure; first fluid pulse generating means associated with said source to generate a standing wave fluidic pulse at a variable frequency, said pulse generating means including output means; fluid proportional amplifier means associated with said source, said amplifier means including an output port means and a plurality of control signal input port means; first conduit means connecting one of said input port means to the output means of said first pulse generating means; an interface device having a fluid input and a fluid output, second conduit means connecting the output port means of the amplifier means to the interface device; and fluidic control means interposed in the conduit means to control the interface device, the fluidic control means including at least one fluidic gate means operable to redirect flow from said source.

2. In an excavator according to claim 1, wherein the excavator comprises a tractor unit pivotally connected to a scraper unit for steering movement therebetween, the scraper unit including a draft frame assembly pivotally supporting a bowl assembly, the motor means connecting said assemblies, the cutting element fixedly connected to the bowl assembly, the control means including manually operable means mounted on the tractor unit adjacent to and for operating the fluidic gate means, and said interface device being mounted on the scraper unit.

3. In an excavator according to claim 1, wherein the first-named control means futrher includes a second fluid pulse generating means associated with said source to generate a second fluid pulse at a fixed frequency, said second pulse generating means including output means and conduit means connecting the output means with a control signal input port of the amplifier means.

4. In an earthmoving scraper of the type including an earthmoving scraper unit connected to a tractor unit; the tractor unit including an internal combustion engine, fuel control means including first movable means to control the amount of fuel directed to said engine, drive wheel means including second movable means drivingly connected to said engine for propelling the scraper; the earthmoving scraper unit including draft frame means connected to the tractor unit, a bowl assembly pivotally connected to the draft means for carrying excavated material, the bowl assembly including a cutting edge and conveyor means positioned in the forward end thereof, drive means for the conveyor means, wheel means freely rotatable connected to the bowl assembly for supporting the same, fluid motor means connected between the draft frame assembly and the bowl assembly for adjusting the elevation of the cutting edge, and means to supply motive energy to actuate the fluid motor means; the improvement comprising:

a control means for directly controlling the flow of motive energy in accordance with the condition of at least one of said movable means, the control means further including means for detecting slippage of the drive means and for controlling the flow of motive energy in accordance with such slippage and means for detecting the speed of the drive means for controlling the flow of motive energy in accordance with such speed, the control means utilizing at least one fluidic gate and causing the fluid motor means to raise and lower the cutting edge in response to fluidic signals generated by the control means, the control means further including means giving priority of control to any signal requiring a higher elevation of the cutting edge.

5. In an earthmoving scraper according to claim 4, wherein the control means further includes a source of fluid under low pressure, first fluid pulse generating means associated with said source to generate a fluidic pulse at a controlled frequency, said pulse generating means including output means, fluid proportional amplifier means associated with said source and including an output port means and a plurality of control signal input port means, first conduit means connecting one of the control signal input port means to the output means of said first pulse generating means, said means to supply motive energy including interface valve means for directing the flow of energy to said motor means, and interface conduit means connecting said output port means of said amplifier means and said interface valve means.

6. In an excavator comprising a tractor unit pivotally connected to a scraper unit for steering movement therebetween, the scraper unit including a bowl assembly, a draft frame assembly pivotally supporting the bowl assembly, a cutting element adapted to contact a surface for excavating the same and fixedly connected to the bowl assembly, motor means for positioning the cutting element and connecting said assemblies, and means to supply motive energy to actuate the motor means, the improvement comprising:

control means for the energy supply means including a source of fluid under low pressure; a plurality of fluid pulse generating means associated with said source to generate standing wave fluidic pulses at variable frequencies and including output port means, a plurality of fluid proportional amplifier means each having an output port means and a plurality of control signal input port means, a plurality of conduit means connecting the output port means of certain pulse generating means to the input port means of certain amplifier means, an interface device being mounted on the scraper unit, the output port means of the amplifier means being connected to the interface device; fluidic control means interposed to control the interface device, the fluidic control means including at least one fluidic gate means operable to redirect flow from the fluid source; and restriction means in connection with the interface device to give priority to a pulse from at least one of the amplifier means, the control means also including manually operable means mounted on the tractor unit adjacent to and for operating the fluidic gate means.

References Cited
UNITED STATES PATENTS

| | | | |
|---|---|---|---|
| 2,629,306 | 2/1953 | Rusconi | 172—2 |
| 3,060,602 | 10/1962 | Buttenhoff | 37—129 |
| 3,064,371 | 11/1962 | Kutzler | 37—126 |
| 3,158,166 | 11/1964 | Warren | 137—81.5 |
| 3,228,410 | 1/1966 | Warren et al. | 137—81.5 |
| 3,266,510 | 8/1966 | Wadey | 137—81.5 |
| 3,346,972 | 10/1967 | Johnson | 37—129 XR |
| 3,386,344 | 6/1968 | Junck et al. | 37—8 XR |
| 3,394,474 | 7/1968 | Rockwell | 37—129 |
| 3,395,719 | 8/1968 | Boothe et al. | 137—81.5 |
| 3,406,951 | 10/1968 | Marks | 137—81.5 XR |
| 3,409,032 | 11/1968 | Booth et al. | 137—81.5 XR |

EDGAR S. BURR, Primary Examiner

U.S. Cl. X.R.

37—8; 137—81.5